United States Patent [19]
Tucchio et al.

[11] Patent Number: 5,366,254
[45] Date of Patent: Nov. 22, 1994

[54] SMART MATERIAL JOINT BAND

[75] Inventors: Michael A. Tucchio, East Lyme; Robert A. Stoodt, Uncasville, both of Conn.; Robert A. Livsey, Warwick, R.I.

[73] Assignee: The United States of America as represented by the Secretary of the Navy, Washington, D.C.

[21] Appl. No.: 176,373

[22] Filed: Dec. 30, 1993

[51] Int. Cl.[5] .............................................. F16L 55/00
[52] U.S. Cl. ..................................... 285/23; 285/308; 285/319; 285/381
[58] Field of Search ............... 285/381, 909, 322, 321, 285/319, 921, 18, 23, 308

[56] References Cited

U.S. PATENT DOCUMENTS

| | | | |
|---|---|---|---|
| 4,379,575 | 4/1983 | Martin | 285/381 X |
| 4,765,199 | 8/1988 | Andersen et al. | 285/322 X |
| 4,872,713 | 10/1989 | Kapgan | 285/381 |
| 4,931,116 | 6/1990 | Rosenzweig | 285/381 X |

*Primary Examiner*—Dave W. Arola
*Attorney, Agent, or Firm*—Michael J. McGowan; Prithvi C. Lall; James M. Kasischke

[57] ABSTRACT

The present invention relates to an improved connector for joining two tubular members together. The connector is formed by a plurality of longitudinally extending fingers extending from an end of one of the tubular members and at least one locking groove in the other of the tubular members for receiving the fingers. The connector further includes a circumferentially extending wire member which is received in a notch in a head portion of each of the plurality of fingers. The wire member is preferably formed from a shape memory alloy and has an original circumference less than the circumference of a circle formed by the notches in the head portions of the fingers. The connector includes apertures through which electric wires may be connected to the shape memory alloy ring member so as to cause the shape memory alloy ring member to return to its original shape and allow release of the joint connection.

10 Claims, 2 Drawing Sheets

SMART MATERIAL JOINT BAND

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (a) Field of the Invention

The present invention relates to an improved connector for joining two tubular members together and has particular application for joining together shell portions forming a torpedo.

(b) Description of the Prior Art

A typical underwater vehicle such as a torpedo or the like is twenty one feet long and consists of five or more sections. The current method of joining vehicle sections together is by the use of joint bands, that is two semi-circular rings that are bolted together. This method, while mechanically efficient, tends to generate noise as water rushes by the crevasses between the sections, the joint band, and the bolt holes. This noise diminishes the effectiveness of the torpedo's listening capabilities. It also makes the vehicle more vulnerable to enemy detection. Consequently, there is a need for an improved method of joining the vehicle sections together.

Underwater vehicle shell sections are generally cylindrical in nature. In the prior art, there are a variety of different connectors for joining together tubular sections such as those of an underwater vehicle. U.S. Pat. No. 4,074,912 to Van Bilderbeek et al., U.S. Pat. No. 4,120,519 to Bridges and U.S. Pat. No. 4,477,104 to Akkerman illustrate some of the known connectors.

In the Van Bilderbeek et al. patent, a connector apparatus is illustrated which has particular utility in pile driving to enable a pile string to be released or disconnected in the vicinity of the mudline after the pile has been driven to its final depth. The connector includes an upper box secured to one portion of a pin apparatus attached by a releasable mechanism to another lower portion of the pin apparatus. Release of the mechanism is effected by a tool operated from a remote location. The release mechanism enables the drive pile string above the lower portion of the pin to be withdrawn through the water to the surface.

The Bridges patent illustrates a readily separable fastening structure for holding a pair of cylindrical sections together in axial alignment. The fastening structure includes annular rim members attached to inside surfaces near the end of the cylindrical sections, one of which has an outwardly extending flange spaced from the end of its corresponding cylindrical section to form an annular groove and the other of which is adapted to telescope within the first such rim member. The second rim member also includes an inwardly extending flange. A plurality of spaced members having spring fingers are attached to the outside of the second cylindrical section and extend beyond the end thereof. The spring fingers each have an inwardly extended ridge and a groove on the outside of the ridge. A small diameter cable is provided in the grooves. Tensioning members are included for pulling the cable tightly around the fingers to pull the inwardly extending ridges into the annular groove to lock the cylindrical members together. A pyrotechnic device is positioned to cut the cable to effect automated sequencing separation of the cylindrical sections.

The Akkerman patent discloses an apparatus for releasably latching the lower end of a tubing string within the bore of an upstanding well conduit by means of latching parts adapted to be received in latching position beneath a shoulder in the bore of the well conduit. The latching parts are locked in latching position by locking means which are engageable and releasable in response to manipulation of the well string. The latching parts are moved into unlatching position, upon release of the locking means, without the necessity of sliding contact between the latching parts and the shoulder. The latching parts include a circular array of disengageable fingers.

Shape memory alloys or smart alloys are also known in the art. They have been used in a variety of different applications because of their ability to change shape as a result of phase changes which occur during changes in their temperature. U.S. Pat. Nos. 4,281,841 to Kim et al., 4,778,074 to Kelly and 4,922,381 to Longerich et al. illustrate some of the applications for shape memory alloys.

More particularly, the Kim et al. patent relates to an all metal, reusable O-ring sealing arrangement for sealing two concentric tubes in an ultra-high vacuum system. The O-ring is formed from a heat recoverable alloy such as Nitinol and is concentrically positioned between protruding sealing rings of two concentric tubes. The O-ring is installed between the tubes while in a stressed martensitic state and is made to undergo a thermally induced transformation to an austenitic state. During the transformation, the O-ring expands outwardly and contracts inwardly toward a previously sized austenitic configuration, thereby sealing against the protruding sealing rings of the concentric tubes.

The Kelly patent relates to a composite material and metal canister having a cylindrical corrosion resistant metal shell and a composite material bulkhead within the shell which provides corrosion resistance and minimal weight coupled with the ability to withstand high internal pressures and bending stresses. The metal shell and the composite bulkhead are joined by a circumferential compression exerted on the shell by an external ring of shape memory material to produce a fluid-type seal therebetween the shell and an adjacent bulkhead.

The Longerich et al. patent is related to an electronics unit wherein a plurality of circular circuit cards are arranged in an aligned, parallel relationship. In this configuration, shape memory alloy rings are positioned around the outer peripheries of certain members to form a hermetic seal between certain regions or portions of the configuration. The shaped memory alloy is preferably selected such that the rings may be installed when at room temperature and then shrunk to form the hermetic seal as the rings are warmed by resistance heating to a predetermined temperatures.

None of these prior art patents however suggest using shape memory alloys as part of an easily releasable joint for joining sections of tubing or sections of a torpedo outer shell together.

SUMMARY OF THE INVENTION

Accordingly, it is an object of the present invention to provide a connector capable of connecting two tubular members without causing serious discontinuities between the two members.

It is a further object of the present invention to provide a connector as above that can be readily and easily separated when necessary.

Still other objects and advantages of the present invention will be set out in the following description and the accompanying drawings wherein like reference numerals depict like elements.

The foregoing objects are attained by the improved connector of the present invention which comprises a plurality of longitudinally extending fingers projecting from a first end of a first member and means for retaining the fingers in a desired position during both assembly and disassembly of the connector. Each of the aforementioned fingers has a head portion and a notch in the head portion for receiving a circumferentially extending wire member. The wire member is preferably formed from a shape memory alloy, has an original circumference less than the circumference of a circle formed by the notches in the head portions of the fingers, and is expandable to a circumference larger than the original circumference in the alloy. The connector further includes at least one locking groove positioned along an inner surface of a second tubular member. The locking groove(s) accommodate the head portions of the fingers when the two members are connected together. Release means are provided for causing the wire member to contract and thereby cause the head portion of the fingers to disengage from the locking groove(s) when disassembly is required. In a preferred embodiment, the release means comprises means for heating the wire member and causing it to return to its original circumference.

Other details of the connector of the present invention are set out in the following description.

DETAILED DESCRIPTION OF THE PREFERRED EMBODIMENT(s)

The present invention uses a shape memory alloy to release the joint between two tubular underwater vehicle sections when access is necessary. When heated to their austenitic phase, shape memory alloys can be formed into a memory shape when hot. Upon cooling, they undergo a phase change from austenite to martensite. In the martensitic phase, they can be deformed up to 8% and when heated, they undergo a phase change back to the austenitic phase and return to the memory shape.

Figure 1:
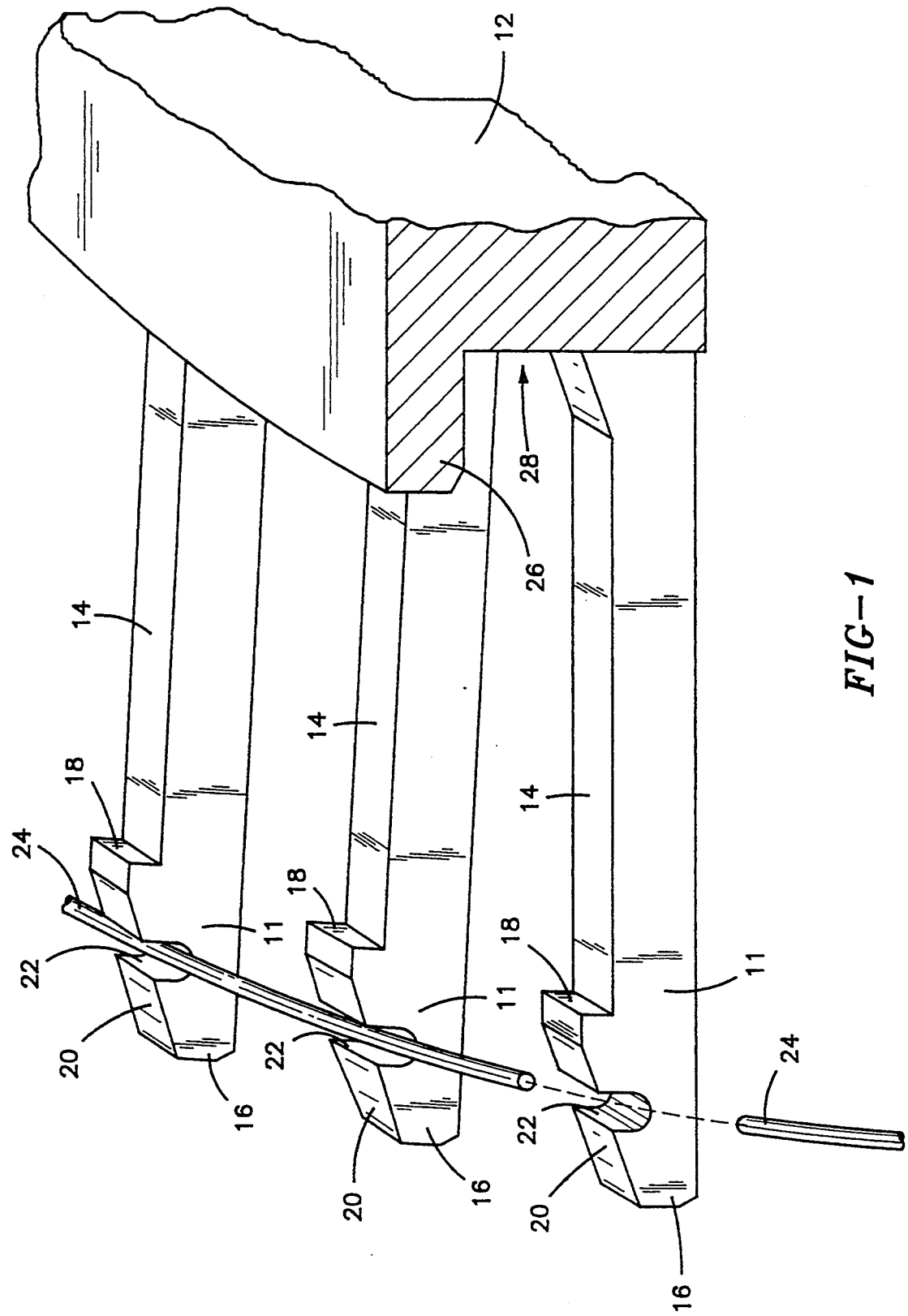
FIG. 1 is a perspective view of a portion of a first part of the connector of the present invention.

FIG. 1 illustrates a perspective view of a portion of a first tubular underwater vehicle section 12 having a plurality of longitudinally extending fingers 14 extending from an inner surface of an end of the section 12. The fingers 14 are spaced about the periphery of the vehicle section 12. From about thirty to about ninety fingers can be positioned around the periphery of the torpedo section.

Each finger 14 has a head portion 16. The head portion 16 extends radially beyond the body 11 of the finger 14 to form a retaining shoulder 18 where the head portion 16 joins the body 11 of the finger 14. The outer surface of the head portion 16 is slanted to provide a compression surface 20 which aids in joining the vehicle sections together. The surface 20 has a notch 22 formed therein to accept a wire ring member 24 formed from a shape memory alloy.

The fingers 14 may be formed from any suitable material known in the art. If desired, they can be formed from the same material as the vehicle section 12.

A lip 26 is also formed at the end of the tubular section 12 as a continuation of the outer surface of the section. The lip 26 begins at the base of the fingers 14 and is shallower than the fingers 14. It too extends about the periphery of the outer section 12. The lip 26 and the fingers 14 together are not as thick as the section 12 and form a mating gap 28 between the fingers 14 extending from the inner surface of the section 12 and the lip 26 extending from the outer surface of the section 12.

The wire ring member 24 can be formed from a number of different shape memory alloys. It is preferred however to form it from a nickel-titanium alloy having a phase change between austenire and martensite at the desired temperature. The nickel-titanium alloy composition will be a nominal 50—50% by weight alloy. The shape memory alloy ring member 24 formed from this material will remember its original shape at up to 8% plastic deformation. Preferably, the original circumference of the wire ring member 24 is thereafter less than the circumference of the circle formed by the notches 22 formed in the fingers 14. The wire ring member 24 is thereafter deformed to a circumference larger than its original circumference and fitted into the notch 22 in each finger 14. Any suitable technique known in the art can be used to deform the wire ring member 24.

Figure 2:
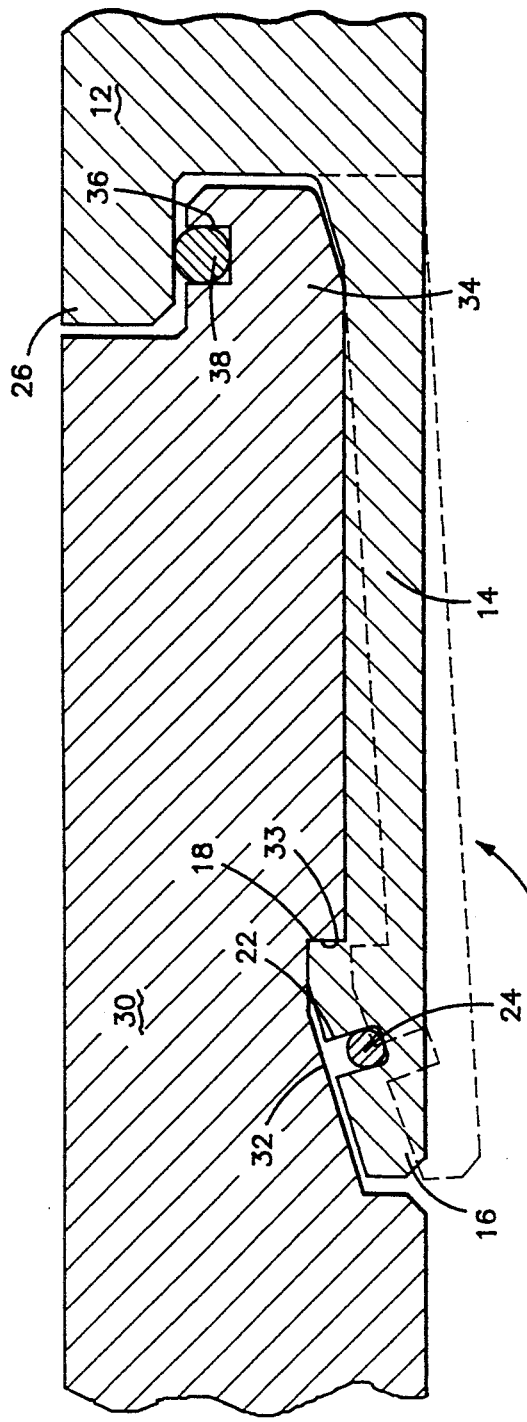
FIG. 2 is a sectional view of the connector of the present invention showing two tubular sections of an underwater vehicle joined together.

FIG. 2 illustrates a cross-section of the joint 10 which is formed when the first vehicle section 12 is mated with a second tubular vehicle section 30. The second vehicle section 30 is provided with at least one locking groove 32 along its inner periphery. When the first vehicle section 12 is inserted into the second vehicle section 30, the locking groove 32 receives the head portions 16 of the fingers 14. The first vehicle section 12 is retained in a longitudinal direction by the engagement of the retaining shoulder 18 of each finger 14 with a wall 33 of the locking groove.

If desired, a single locking groove 32 can be replaced by a plurality of locking grooves spaced around the inner periphery of section 30. Each locking groove 32 can be shaped to accommodate the head portion 16 of a respective finger 14.

As shown in FIG. 2, the second vehicle section 30 has an annular shoulder 34 formed at one end. The annular shoulder 34 fits into the mating gap 28 between the fingers 14 and 26. If desired, a circumferential O-ring groove 36 can be formed in the annular shoulder. An O-ring 38 can be provided in the groove 32 to seal the joint 10 against leakage.

Figure 3:
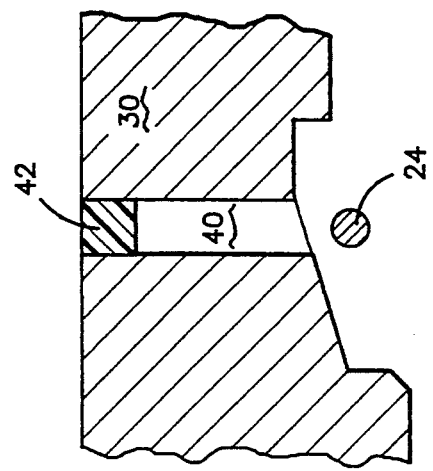
FIG. 3 illustrates a cross-sectional view of a release aperture in one of the vehicle sections.

Referring now to FIG. 3, at least two release apertures 40 are formed in the second vehicle section 30. The apertures 40 are preferably spaced 180° apart and extend through the section from the outer surface to the inner surface thereof. The release apertures 40 are positioned longitudinally to communicate with ring member 24. As shown in FIG. 3, release aperture 40 is positioned to correspond with the gap between the fingers 14. The release apertures 40 are preferably sealed with plugs 42 during operation.

When the two vehicle sections 12 and 30 are to be separated, the plugs 42 are removed from the release apertures 40 and an electric current is applied to ring 24 by inserting electrical conductors (not shown) through the apertures 40 and fixing them to the wire ring member 24. The electrical current thus applied causes ohmic heating of the wire ring member 24. Once the ring member 24 reaches a critical temperature (approximately 80° C.), it changes phase to austenire causing it to return to its original shape. Since the wire ring member 24 originally had a smaller circumference than its circumference in the locking position, the phase change causes the wire ring member 24 to contract and pull the fingers 14 inward. The withdrawal of the fingers 14 in this manner disengages the fingers 14 from the locking groove 32 and allows separation of the sections 12 and 30.

As can be seen from the foregoing description, the present invention provides a method for joining together two vehicle sections without causing serious discontinuities between the two sections being joined. Furthermore, the two sections can be readily separated by applying the current at two apertures in one of the sections. Underwater vehicle sections can be joined with this method without having protruding bolt heads or other discontinuities which cause excessive noise.

While the present invention has been discussed in the context of joining two vehicle sections together, it should be recognized that the connector of the present invention can be used in other applications where two tubular sections must be temporarily or permanently joined.

While a specific shape memory alloy has been described herein, it should be recognized that there are different shape memory alloys which can be used for the wire ring member 24. The particular alloy chosen for the wire ring member must take into account the operating temperature of the device and the desired separation temperature.

The lip and shoulder arrangement at the end of the sections can be omitted in applications where maintaining a water tight joint is not critical. As previously discussed, the internal locking groove 32 does not need to be a complete groove. Rather, distinct locking groove pits can be formed on the inner surface of the second section to prevent rotation of the sections with respect to one another.

It is apparent that there has been provided in accordance with this invention a smart material joint band which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An improved connector for joining together a first tubular member and a second tubular member, said connector comprising:

a plurality of fingers extending longitudinally from an end of a first one of said tubular members, each of said fingers having a head portion with locking means thereon and a notch in said head portion, said notches in said fingers defining a first circumference;

a ring-shaped wire member positioned within said notches for retaining said fingers in a desired position, said ring-shaped wire member being formed from a shape memory alloy; and said second one of said tubular members having at least one locking groove formed on an interior surface thereof, said locking means and said head portions of said fingers being seated within and engaging said at least one locking groove for locking said first and second tubular members together when said first tubular member is joined to said second tubular member.

2. The connector of claim 1 wherein said wire member is formed from a nickel-titanium alloy having a phase change between austenite and martensite at a desired temperature and a memory characteristic that allows it to return to its original shape at up to 8% plastic deformation.

3. The connector of claim 1 wherein said ring-shaped wire member has an original circumference less than said first circumference defined by said notches in said fingers, said ring-shaped wire member being deformed plasticly to said first circumference.

4. The connector of claim 3 wherein:

said locking means on each said head portion extends radially beyond a body portion of the finger to form a retaining shoulder where said head portion meets said body portion; and each said head portion has a slanted outer surface.

5. The connector of claim 4 further comprising:

release means for causing said wire member to contract and for causing said head portions of said fingers to disengage from said at least one locking groove.

6. The connector of claim 5 wherein said release means comprises means for heating said wire member and causing it to return to its original circumference.

7. The connector of claim 6 wherein said heating means comprises means for applying an electrical current to said wire member, which current causes ohmic heating of the wire member and a phase change of said alloy forming said wire member to austenire.

8. The connector of claim 7 wherein said release means comprises at least one aperture through said second one of said members and through which said current applying means can be attached to said wire member.

9. The connector of claim 8 further comprising:

said first tubular member having a lip portion which defines a mating gap with said fingers; and said second tubular member having an annular shoulder which fits into said mating gap when said tubular members are joined together.

10. The connector of claim 9 wherein said annular shoulder has a circumferentially extending groove therein, and further comprising an O-ring disposed in said groove in said annular shoulder for forming a seal against fluid leakage.

* * * * *